INVENTORS.
ROBERT ASHTON &
BY JERZY M. BRZUSTOWSKI

ATTORNEYS.

Feb. 10, 1970   R. ASHTON ET AL   3,494,115
VIBRATIONAL GRAIN SEPARATING APPARATUS FOR AGRICULTURAL COMBINES
Filed Sept. 1, 1966   3 Sheets-Sheet 3

INVENTORS
ROBERT ASHTON &
BY JERZY M. BRZUSTOWSKI

Tweedale & Gerhardt
ATTORNEYS.

3,494,115
VIBRATIONAL GRAIN SEPARATING APPARATUS FOR AGRICULTURAL COMBINES
Robert Ashton, Islington, Ontario, and Jerzy M. Brzustowski, Toronto, Ontario, Canada, assignors to Massey-Ferguson Industries Limited, Toronto, Ontario, Canada
Filed Sept. 1, 1966, Ser. No. 576,737
Int. Cl. A01d 45/02
U.S. Cl. 56—21                                    11 Claims

ABSTRACT OF THE DISCLOSURE

A combine having pairs of counter-rotating rotors with two blade members projecting radially in opposite directions from and extending parallel to the rotary axis of each rotor in the place of straw walkers. The rotors of each pair are spaced from each other a distance substantially less than the diameter of the circular path circumscribed by the blades during rotation. The rotors are also synchronized so that the blades strike the material imposing forces having both transverse components and a component in the direction of travel toward the discharge opening and the material is moved along a substantially sinusoidal path. The vibrations in opposite directions transverse to the direction of travel to the discharge opening cause the grain kernels to separate from the lightweight crop substance and impel the kernels out of the path of the lightweight crop substance.

---

This invention relates generally to apparatus for separating grain from harvested crop material, and is particularly concerned with the separation of the kernels remaining in the mixture of crop material after it has passed through the threshing unit of a combine.

Conventional combines have straw walkers for receiving the mass of crop material from the threshing concave and advancing it to the rear of the combine for discharge. The straw walkers consist of parallel sections which reciprocate vertically to lift and drop the crop material to loosen the material and shake out any grain kernels remaining in the mixture of material. Since the grain kernels are heavier than the remaining crop material, the forces generated by the lifting and dropping action of the straw walkers tend to cause the kernels to separate from the crop material and fall into a grain pan or other grain collecting means.

Usually, the capacity of the combine is limited to the ability of the straw walkers to efficiently separate the grain kernels from the mixture of crop material and convey the remaining crop material to the discharge end of the combine, and even when the straw walkers operate at peak capacity, a considerable amount of grain is discharged from the combine with the straw or husks. Any increase in the rate at which material is fed to the straw walkers decreases the ability of the straw walkers to separate the grain kernels from the remaining lightweight portion crop material. Furthermore, the size and hence capacity, of the straw walker portion of the combine must necessarily be limited by the physical dimensions of the combine body.

As pointed out previously, the grain separating action of the straw walkers results from the lifting and dropping action of the reciprocating straw walker sections which generates forces on the material tending to cause the heavier grain kernels to fall away from the relatively light-weight straw, husk or cobs. Since the straw walkers agitate the material by a lifting and dropping action, acceleration forces of approximately one $g$ only can be imposed on the material by the straw walkers. The kernels remaining with the straw, stalks, etc., after the material has passed through the threshing unit usually require much larger forces for separation.

In accordance with the present invention, the straw walkers are replaced by a vibrating and separating unit for conveying the crop material from the threshing unit to the discharge opening or other delivery point, and at the same time subjecting the material to vigorous transverse vibrations to subject the grain kernels to acceleration forces substantially greater than one $g$. The vibrating and conveying means includes opposed impelling members located on opposite sides of the path of the crop material which cooperate to impose transverse forces on the crop material in opposite directions and pass the material toward the discharge end of the combine from the threshing unit.

The separating units may be in the form of pairs of counter-rotating rotors located on opposite sides of the path of the material, each rotor having a pair of blades projecting in opposite directions from the rotary axis. Preferably, the rotors are driven in synchronization with each other such that they rotate substantially ninety degrees out of phase with each other. As the crop material passes between the rotors, the blades strike the material and impose forces having both a transverse component and a component in the direction of travel toward the discharge opening onto the crop material. The transverse forces cause rapid acceleration and deceleration of the material from one rotor to the other. Since the grain kernels have a greater mass than the remaining crop material, the kernels tend to separate and fall out of the path of the crop material onto a grain pan or other collecting means. The speed of the material as well as the magnitude of the acceleration forces increases with the speed of rotation of the rotors. Hence the limiting factor in the passage of the material from the threshing unit to the discharge opening of the combine is determined by the magnitude of the forces that will cause damage to the grain kernels. Therefore, the rate of feed of the material into the vibrating separating units can be increased up to the point at which damage occurs.

A plurality of the separating units may be spaced along the path of the material from the threshing unit and driven preferably in synchronization with each other such that the material follows a substantially sinusoidal path, the amplitude of which is determined by the spacing between the rotary axes of the rotors of each separating unit and their relative angular positions. The maximum amplitude is obtained when the rotors of each unit are ninety degrees out of phase with each other such that when one rotor is disposed normal to the path of travel, the other will be disposed parallel thereto, with the rotors of the adjacent separating unit ninety degrees out of phase with each other and with the rotors of the preceding unit on the same side of the path of travel.

The rotors may be mounted on either horizontal or vertical axes to provide either vertical or horizontal vibration, respectively. However, with the rotors mounted on vertical axes, the grain kernels are thrown from side to side and do not have to pass through the stream of crop material to the grain collecting means as would be the case when the rotors are mounted on horizontal axes.

Since moisture increases the mass of the grain kernels, the performance of the vibrating separators improves with wet crop material. The increased mass of the grain kernels relative to the straw, stalks, cobs, or husks correspondingly increases the effect of the acceleration forces on the grain kernels. This is true even though the lightweight material is wet since the lightweight material, being less dense than the grain kernels, releases its moisture much more easily.

The objects, advantages and features of the invention will become apparent from the following description taken in connection with the accompanying drawings in which.

Figure 1:
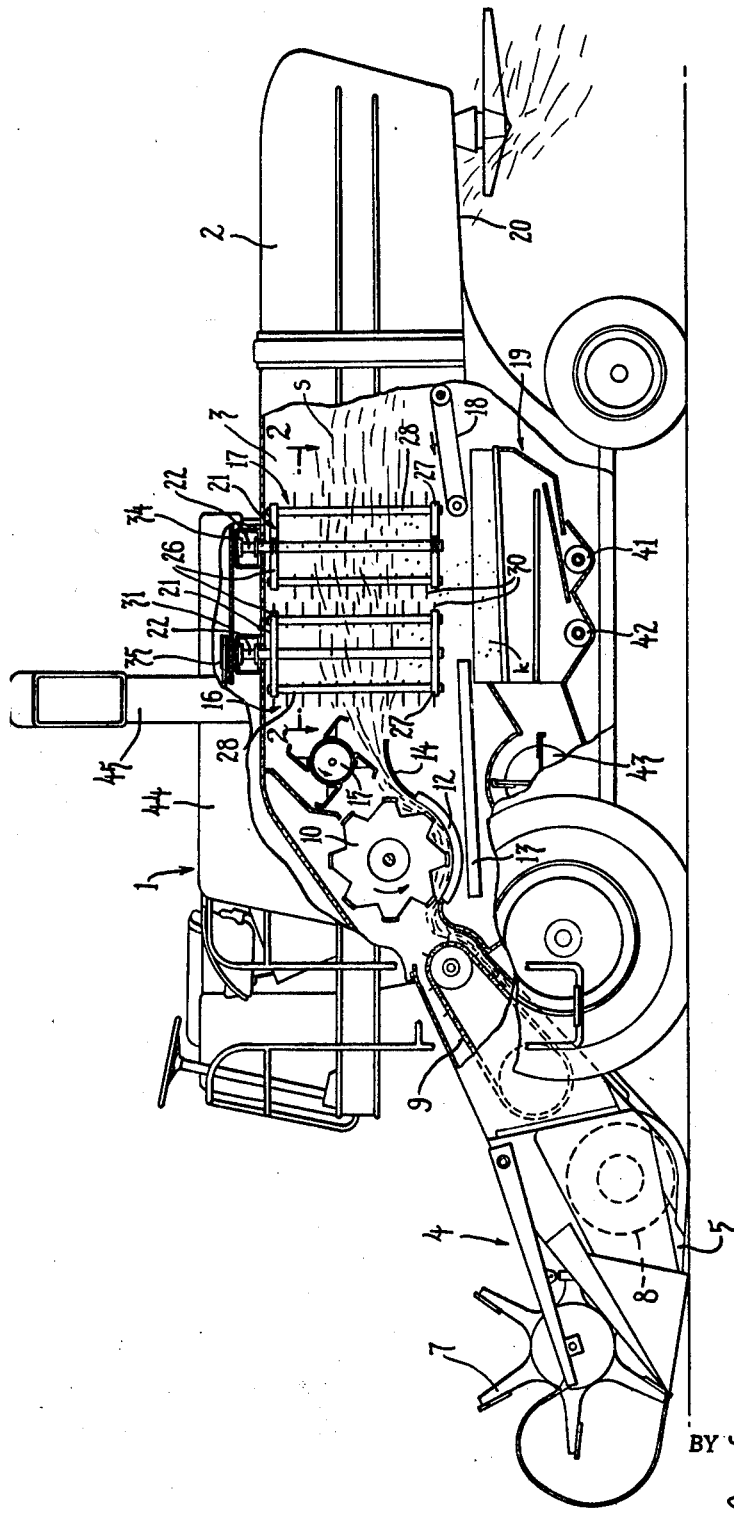
FIG. 1 is an elevational view, partially in section, of an agricultural combine having vibrating separating and conveying units embodying the invention.

In FIG. 1, a typical, self-propelled agricultural combine is designated generally by reference numeral 1 and includes a wheeled main body 2 including a housing enclosing a threshing and separating chamber 3. Mounted on the forward end of the main body 2 is a conventional header assembly 4 including a table 5, harvesting reel 7, and auger 8. The reel 7 guides standing crop material over a cutter bar (not shown) onto the table 5, and auger 8 feeds the material to an elevator 9 for delivery into the inlet end of chamber 3.

As the material enters chamber 3, it passes through a threshing unit consisting of a rotary cylinder 10 and concave 12 where a large portion of the grain kernels are separated and fall through the concave 12 onto a grain pan 13. The remaining crop material, consisting of a mixture of straw, chaff or husks and cobs in the case of corn (maize), together with a considerable amount of grain kernels, passes onto a grate 14, and in the illustrated embodiment, is hurled rearwardly by a conventional rotary beater 15.

In conventional combines, the crop material is delivered from the threshing unit onto reciprocating straw walkers. According to the present invention, however, the straw walkers are replaced by vibrating separating and conveying units, the illustrated combine having two such units designated by reference numerals 16 and 17. The crop material is moved rearwardly by separating units 16 and 17, the heavier grain kernels $k$ falling onto a conveyor 18, or a conventional vibrating grain pan, and into a conventional shaker shoe assembly 19. The lightweight crop material $s$ is thrown rearwarly through the discharge opening 20 of the combine.

Figure 2:
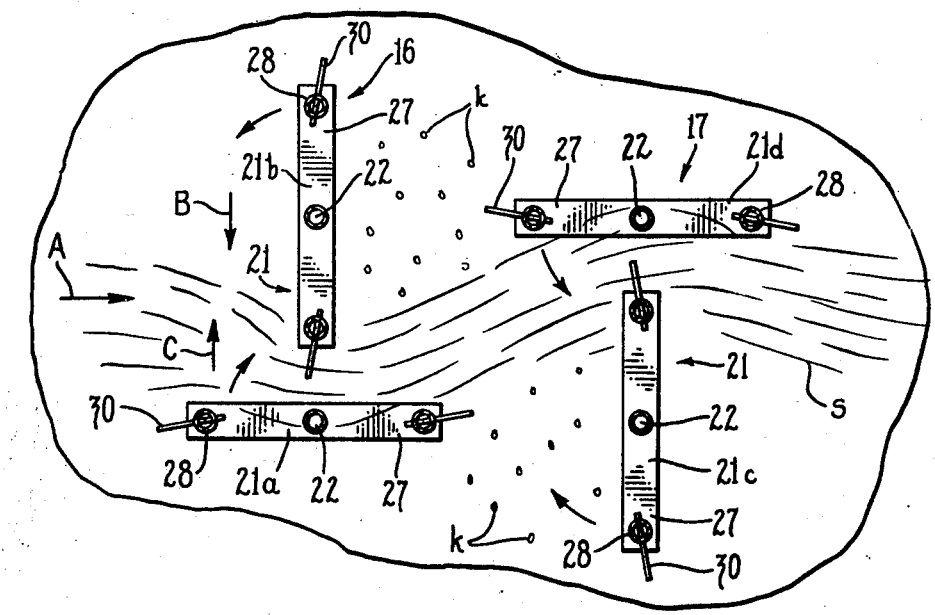
FIG. 2 is a view taken along lines 2—2 of FIG. 1.
Figure 3:
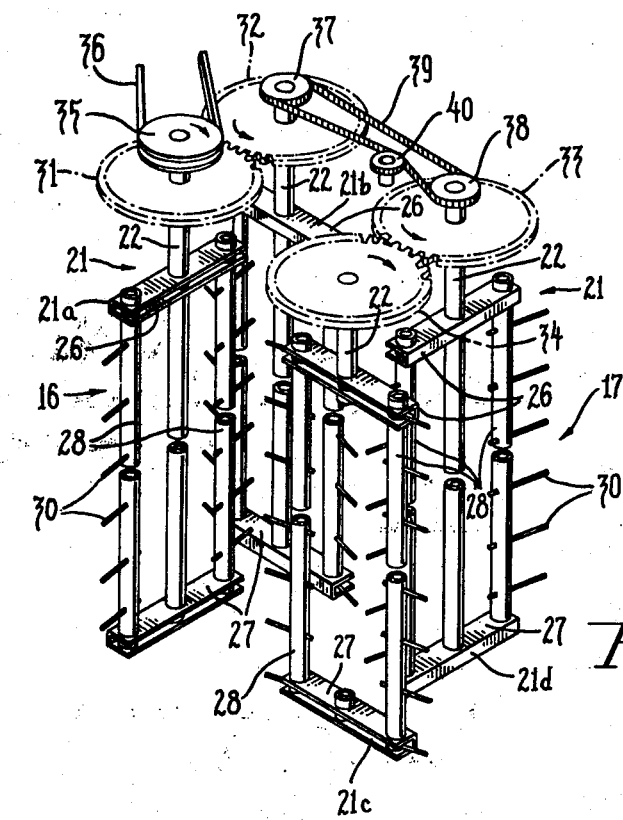
FIG. 3 is a perspective view of the separating unit in the combine of FIG. 1.

With reference to FIGS. 2 and 3, separating units 16 and 17 are each made up of a pair of counter-rotating rotors 21. In FIG. 2 the counter-rotating rotors of separating unit 16 are designated by reference numerals 21a and 21b, and the rotors of separating unit 17 are indicated by numerals 21c and 21d. Rotors 21 are supported on shafts 22 the upper ends of which are journalled in suitable bearings (FIG. 1). Each of the rotors 21 has a transverse end frame 26 non-rotatably secured to the upper end of shaft 22 and an end frame 27, parallel to end frame 26, non-rotatably secured to the lower end of shaft 22. Mounted between the parallel end frames 26 and 27 is a pair of blade members in the form of tubular members or bars 28 which are disposed on diametrically opposite sides of the rotary axis of shaft 22. A plurality of fingers 30 are mounted transversely in the tubular bars along their lengths. Each blade member 28 and the half of frame members 26 and 27 on which it is supported constitutes an impeller or rotor blade.

Meshed gears 31 and 32 are fixed to the shafts 22 of rotors 21a and 21b, respectively, and meshed gears 33 and 34 are mounted on the shafts 22 of rotors 21d and c, respectively. The shaft 22 of rotor 21a is driven by a belt 36 mounted at one end on a pulley 35 fixed to the shaft. Rotation of rotor 21a is transmitted to rotor 21b through gears 31 and 32. Gear 32 drives gear 33 through a belt or chain 39 engaged with pulleys or sprockets 37 and 38 mounted respectively on the shafts 22 of rotors 21b and 21d, and the resulting rotation of rotor 21d is transmitted to rotor 21c through gears 33 and 34. A tension idler sprocket or pulley 40 may also engage the belt or chain 39 between the sprocket or pulleys 37 and 38.

It is apparent that rotors 21a and 21b rotate in opposite directions about the axes of their respective shafts 22, and that rotors 21c and 21d rotate in opposite directions about their respective rotary axes.

Moreover, rotor 21a is angularly displaced ninety degrees with respect to rotor 21b and rotor 21c is angularly displaced ninety degrees with respect to rotor 21d. Stated another way, the counter-rotating rotors 21a and 21b of the separating unit 16 are synchronized by gears 31 and 32 to rotate ninety degrees out of phase with each other such that when rotor 21a is disposed parallel to the path of the crop material as shown in FIG. 2, rotor 21b is disposed normal or perpendicular to the path of the crop material. Similarly, the rotors 21c and 21d of unit 17 are synchronized by gears 33 and 34 to rotate ninety degrees out of phase with each other; and preferably, for reasons pointed out below, rotors 21a and c, and rotors 21b and d are driven to rotate ninety degrees out of phase with each other as shown in FIG. 2. Consequently, as the crop material is engaged by the blades or bars 28 on the opposed beaters, it is caused to vibrate transversely from side to side as indicated by the opposed arrows B and C and at the same time is given a longitudinal component of force by the blades in the direction of arrow A to advance it toward the discharge end 20 of the combine. The transverse vibration causes the grain kernels $k$ to be separated from the lighter crop material.

The crop material moves from the threshing unit along a path indicated generally by the arrow A in FIG. 2. As it moves into separating unit 16 between rotors 21a and 21b, the blades members 28 act as impelling members and strike the material on either side of the path of travel to impose forces on the material having components transversely of arrow A and in the direction of arrow A, or axially. The transverse force components imposed by the blades of rotor 21b are in the direction of arrow B in FIG. 2, and the transverse force components imposed by the blades 28 of rotor 21a are in the opposite direction as indicated by arrow C in FIG. 2. Consequently, the crop material is hurled in opposite transverse directions by rotors 21a and 21b as it is advanced axially by the rotors. This transverse vibration relative to the path of movement in the direction of arrow A imposes high acceleration and deceleration forces on the grain kernels tending to separate them from the lighter weight material and hurl the grain kernels out of the path of the crop material.

As the material is advanced rearwardly from the separating unit 16, it passes between rotors 21c and 21d of separating unit 17. The blades 28 of rotors 21c and d act on the material in a similar manner to rotors 21a and b to vibrate the material transversely of its path of movement. As illustrated in FIG. 2, the counter-rotating rotors of the separating units cause the material to move along a generally sinusoidal path, the amplitude of which is determined by the spacing between the rotors and their angular relationship. The spacing between the rotary axes of rotors 21a and 21b is less than the diameter of the circular path circumscribed by blades 28 of each rotor. Stated another way, the radial length of the blades as determined by the distance between the axis of shaft 22 and the blade 28 is more than half the distance between the rotary axes of the opposed pair of rotors 21a and b, and 21c and d. Furthermore, as the angular displacement between the blades of the opposed pair of rotors increases, the amplitude of the transverse vibrations of the crop material will increase. Consequently, the maximum vibration takes place when the rotors are ninety degrees out of phase with each other as shown in FIG. 2. The amplitude of the transverse vibration is also at maximum when each rotor has only two blades projecting in opposite directions from its rotary axis as shown.

The fingers 30 engage the crop material with a combing action and assist in loosening the material and advancing it toward discharge opening 20. Preferably, the fingers 30 are inclined to the plane of the blades toward the inlet of the separating chamber when their rotors are in the positions of rotors 21b or 21c in FIG. 2. The combing action is improved when the outer ends of the fingers trail the blades. The straw, or other lightweight material is hurled rearwardly to discharge opening 20 by the rotors, and the kernels fall onto either the shaker shoe 19 or the conveyor 18. The grain kernels from grain pan 13 and conveyor 18 are delivered onto the cleaning or shaker shoe 19, the clean grain going to a grain tank auger 42 and the tailings passing to rethreshing auger 41 in the conventional manner. A conventional fanning mill 43 is illustrated for blowing the chaff and small bits of straw from the shaker shoe screens to the discharge opening 20. Auger 42 conveys the clean grain to grain tanks 44 from which the grain is removed by an unloading auger 45.

Figure 4:
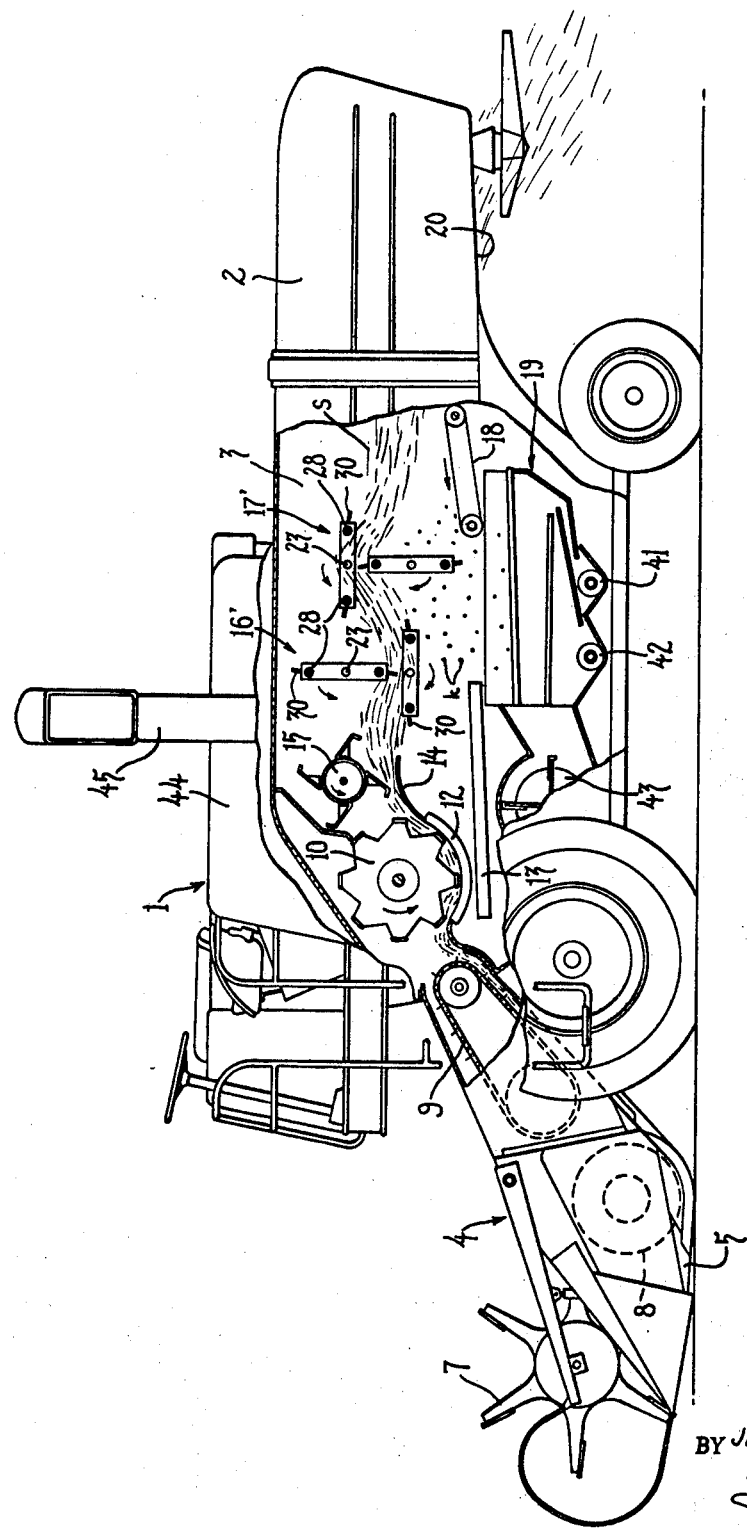
FIG. 4 is a view similar to FIG. 1 showing an alternate arrangement.

FIG. 4 shows an alternative arrangement of the rotary separating units wherein rotary separators 16' and 17' of identical construction to the units 16 and 17 of the embodiment of FIG. 1 are mounted for rotation about horizontal axes. The horizontal arrangement of the separating units provides vibrations in a vertical plane instead of a horizontal plane as in the previous embodiment. The grain kernels are hurled up and down by the rotors instead of from side to side. This has some disadvantage in that the kernels that are thrown upwardly out of the path of the material must pass downwardly through the straw to fall onto the grain collecting means. Otherwise, the performance is substantially the same as that of the FIG. 1 embodiment. In the FIG. 1 embodiment, since the vibration of the material is from side to side, the kernels are not impeded by the crop material in their fall to the grain collecting apparatus after separating.

While the rotary separator has been illustrated and described in conjunction with a specific self-propelled combine, it is apparent that its use is not limited to any specific type of combine or threshing machine. Moreover, the invention is not limited to the specific construction or number of separating units shown. Under some conditions, one unit made up of a single pair of rotors or other cooperating vibrators will be adequate, while other conditions might call for two or more separating units.

Other forms of the invention, all falling within the scope and spirit of the invention, will be apparent to those skilled in the art.

We claim:

1. Grain separating appaartus comprising a housing having a material receiving station, means for delivering harvested crop material containing a mixture of relatively lightweight crop substance and relatively heavy grain kernels to the material receiving station, and vibrating and conveying means in the housing operable to move the crop material from the material receiving station to a discharge opening spaced therefrom while subjecting the crop material to rapid, abrupt vibrations in opposite directions transverse to the direction of travel to the discharge opening to impose forces on the material tending to cause the relatively heavy grain kernels to separate from the lightweight crop substance and impel the grain kernels out of the path of travel to the discharge opening, said vibrating and conveying means comprising at least one pair of counter-rotating rotors, with at least one blade on each rotor, having parallel rotary axes transversely spaced from each other on opposite sides of the path of the crop material to the discharge opening a distance substantially less than the diameter of the circular path circumscribed by each of the blades during rotation of the rotors.

2. In a self propelled combine having a wheeled main body, a crop gathering header for gathering material from the ground including a mixture of relatively heavy grain kernels and relatively lightweight crop substance, an elevator for delivering the crop material from the header, and a main body containing a threshing unit for receiving the crop material from the elevator and separating the major portion of the grain kernels from the lightweight crop substance, and a grain collecting and cleaning means for receiving the separated grain kernels and removing chaff and refuse particles therefrom, the improvement comprising vibrating and conveying means located within the main body of the combine above the grain collecting and cleaning means for receiving partially threshed crop material from the threshing unit, separating any grain kernels remaining therein, and discharging the lightweight substance from the combine through a discharge opening in the main body of the combine, wherein said vibrating and conveying means comprises at least one pair of counter-rotating rotors having parallel rotary axes transversely spaced from each other on opposite sides of the path of the crop material through the main body, each of said rotors having a pair of blade members projecting radially in opposite directions from and extending parallel to, its rotary axis, said rotors being of substantially identical size and spaced from each other a distance substantially less than the diameter of the circular path circumscribed by the blades during rotation of the rotors, and said rotors being synchronized with each other substantially ninety degrees out of phase with each other such that when the blades of one of the rotors are disposed substantially normal to the path of the crop material to the discharge opening, the blades of the other rotor will be disposed substantially parallel to said path, said blades engaging said crop material during rotation of the rotors in opposite directions to subject the crop material to forces having opposite transverse components to cause said rapid, abrupt vibrations as well as components in the direction of the rear end of the main body to cause the material to move along the length of the main body.

3. The construction claimed in claim 2 wherein each of said rotors comprises a pair of spaced, parallel end frames supported at their midpoints on the rotary axis of the rotor and extending transversely thereto, a pair of tubular members mounted between the ends of the end frame members on opposite sides of and parallel to the rotary axis, said tubular members and their associated end frame portions constituting said blade members.

4. The construction claimed in claim 3 further including a plurality of fingers mounted transversely in each of said tubular members and spaced along the lengths thereof, said fingers projecting outwardly from the tubular members and inclined such that their outer ends trail the tubular members during rotation thereof to comb and loosen the crop material as it passes between the rotors.

5. An agricultural combine including a main body having a crop gathering header, an elevator for delivering crop material from the header, a threshing unit including a cylinder rotatable about a horizontal axis transverse to the combine longitudinal axis, and conveying and separating apparatus in the main body for receiving a partially threshed mixture of relatively heavy grain kernels and relatively lightweight crop substance from the threshing unit and discharging the lightweight material from the combine while separating the grain kernels therefrom, said conveying and separting apparatus comprising a pair of counter-rotating rotors having parallel, vertical rotary axes spaced from each other on opposite sides of the path of movement of the crop material toward the rear end of the main body, each of said rotors having a pair of blade members projecting radially in opposite direction from, and extending parallel to, its rotary axis, said rotors being of substantially identical size and spaced from each other a distance substantially less than the diameter of the circular path circumscribed by the blades during rotation of the rotors, and said rotors being synchronized with each other substantially ninety degrees out of phase with each other such that when the blades of one of the rotors is disposed substantially normal to the path of the crop material to the discharge opening, the blades of the other rotor will be disposed substantially parallel to said path, said blades engaging said crop material during rotation of the rotors in opposite directions to subject the crop material to forces having opposite transverse components to cause rapid, abrupt vibrations as well as components toward the rear end of the main body.

6. An agricultural combine as claimed in claim 5 further including a pluarilty of fingers mounted transversely in each of said tubular members and spaced along the lengths thereof, said fingers projecting outwardly from the tubular members and inclined such that their outer ends trail the tubular members during rotation thereof to comb and loosen the crop material as it passes between the rotors.

7. The grain separating apparatus of claim 1 wherein the rotating rotors of each pair are rotatably synchronized with each other to alternately strike the material and impose forces on the material having both a transverse component and a component in the direction of the discharge opening.

8. The grain separating apparatus of claim 7 wherein the transverse force components generated by the blade member on one of said rotors is opposite to the direction of the transverse force component generated by the blade of the other rotor of each pair of counter-rotating rotors.

9. The grain separating apparatus of claim 7 wherein each rotor has a pair of blade members projecting radially in opposite directions from each rotary axis.

10. The grain separating apparatus of claim 9 wherein the rotors of each pair of counter-rotating rotors are driven substantially ninety degrees out of phase with each other with respect to their axis such that when the blades of one of the rotors is disposed substantially normal to the path of movement of the crop material toward the discharge opening, the blade of the other rotor will be disposed substantially parallel to said path.

11. The grain separating apparatus of claim 10 wherein the vibrating and conveying means comprises a plurality of pairs of synchronized counter-rotating rotors with each pair synchronized to rotate substantially ninety degrees out of phase with the adjoining pair of rotors so that the material passes from one pair of rotors to another along a substantially sinusoidal path.

References Cited

UNITED STATES PATENTS

| 287,665 | 10/1883 | Graves | 130—23 |
| 1,263,980 | 4/1918 | Wiglesworth | 130—27 |
| 2,292,650 | 7/1942 | Oehler et al. | 56—21 XR |

ANTONIO F. GUIDA, Primary Examiner

U.S. Cl. X.R.

130—23